(12) United States Patent
Kauer et al.

(10) Patent No.: US 8,439,008 B2
(45) Date of Patent: May 14, 2013

(54) INTERNAL COMBUSTION ENGINE COMPRISING AN INTEGRATED OIL DIPSTICK GUIDING ELEMENT

(75) Inventors: Reiner Kauer, Gross-Gerau (DE); Jan Zimmermann, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 538 days.

(21) Appl. No.: 12/094,872

(22) PCT Filed: Jun. 9, 2006

(86) PCT No.: PCT/EP2006/005512
§ 371 (c)(1),
(2), (4) Date: Sep. 7, 2010

(87) PCT Pub. No.: WO2006/136295
PCT Pub. Date: Dec. 28, 2006

(65) Prior Publication Data
US 2011/0011366 A1   Jan. 20, 2011

(30) Foreign Application Priority Data
Jun. 22, 2005  (DE) .......................... 10 2005 028 807

(51) Int. Cl.
*F01M 1/02*   (2006.01)
*F02F 7/00*   (2006.01)

(52) U.S. Cl.
USPC ...................... 123/196 R; 123/195 H; 184/1.5

(58) Field of Classification Search .............. 123/195 H, 123/196 R; 184/1.5, 6.4
See application file for complete search history.

(56) References Cited

U.S. PATENT DOCUMENTS

| 4,213,441 A | 7/1980 | Hamparian |
| 4,466,401 A * | 8/1984 | Ogawa et al. ............. 123/195 H |
| 4,702,204 A | 10/1987 | Anno et al. |
| 5,850,823 A | 12/1998 | Kasahara |
| 7,373,912 B2 * | 5/2008 | Self et al. .................. 123/196 R |

FOREIGN PATENT DOCUMENTS

| DE | 3544213 A1 | 6/1986 |
| DE | 4341583 A1 | 6/1995 |
| DE | 4400324 C2 | 5/1997 |
| DE | 19747740 A1 | 6/1998 |
| DE | 29906974 U1 | 8/1999 |
| DE | 29914157 U1 | 12/1999 |

(Continued)

OTHER PUBLICATIONS

International Search Report for International Application No. PCT/EP2006/005512 dated Jul. 12, 2006.

*Primary Examiner* — Noah Kamen
(74) *Attorney, Agent, or Firm* — Ingrassia Fisher & Lorenz, P.C.

(57) ABSTRACT

An internal combustion engine for a motor vehicle is provided with a crankcase that contains lubricating oil and on which a cylinder block with several cylinder bores is arranged. The cylinder bores are closed with a cylinder head that is arranged on the cylinder block and features cylinder head covers for covering a valve mechanism mounted on the cylinder head. Means are provided for guiding a dipstick that serves for determining the filling level of the lubricating oil. The means for guiding the dipstick are realized in the form of cast channels that extend through at least the cylinder head and the cylinder block. The upper outlet of the channels is provided for inserting and removing the dipstick in the region of one cylinder head cover.

7 Claims, 2 Drawing Sheets

FOREIGN PATENT DOCUMENTS

| | | |
|---|---|---|
| DE | 20007688 U1 | 10/2000 |
| DE | 10339364 | 3/2005 |
| DE | 10351575 | 6/2005 |
| EP | 0515925 A1 | 12/1992 |
| EP | 0547384 A1 | 6/1993 |
| JP | 9032529 A | 2/1997 |
| JP | 9053435 A | 2/1997 |
| JP | 9088539 A | 3/1997 |
| JP | 9170422 A | 6/1997 |
| JP | 9317434 A | 12/1997 |
| JP | 10002211 A | 1/1998 |
| JP | 10212921 A | 8/1998 |
| JP | 10280936 A | 10/1998 |
| WO | 03054491 A2 | 7/2003 |

* cited by examiner

INTERNAL COMBUSTION ENGINE COMPRISING AN INTEGRATED OIL DIPSTICK GUIDING ELEMENT

CROSS-REFERENCE TO RELATED APPLICATIONS

This application is a U.S. National-Stage entry under 35 U.S.C. §371 based on International Application No. PCT/EP2006/005512, filed Jun. 9, 2006, which was published under PCT Article 21(2) and which claims priority to German Application No. 102005028807.3, filed Jun. 22, 2005, which are all hereby incorporated in their entirety by reference.

TECHNICAL FIELD

The present invention generally relates to an internal combustion engine for a motor vehicle with a crankcase that contains lubricating oil and on which a cylinder block with several cylinder bores is arranged, and the cylinder bores are closed with a cylinder head that is arranged on the cylinder block and features cylinder head covers for covering a valve mechanism mounted on the cylinder head. The present invention also relates to guiding a dipstick that serves for determining the filling level of the lubricating oil. The present invention further relates to all oil bath-lubricated internal combustion engines that in addition to electronic oil level measuring devices are also equipped with a conventional dipstick for manually measuring the oil level in the crankcase.

BACKGROUND

It is known from the general state of the art to guide a dipstick by means of a steel tube that is externally mounted on the internal combustion engine. The steel tube is bent in order to be adapted to the contour of the internal combustion engine and detachably fixed on the crankcase of the internal combustion engine on its lower end with the aid of screws and seals. Along its longitudinal direction, the steel tube is usually fixed on the internal combustion engine at several points in the region of the cylinder block and/or cylinder head with the aid of additional mounting means. The steel tube ends at an easily accessible location in the engine compartment in the region of the cylinder head. The dipstick is inserted into the upper opening of the steel tube, as well as sealed relative to the steel tube by means of an elastomer ring and fixed therein.

In this solution, it is disadvantageous that a number of separate components is required for externally mounting the steel tube on the internal combustion engine. This is associated with a corresponding installation expenditure. In addition, it needs to be ensured that the externally arranged steel tube for the dipstick cannot be damaged due to external mechanical influences during the transport and the storage of the internal combustion engine before its installation into a motor vehicle.

It was already attempted to avoid the aforementioned disadvantages by directly realizing channels for guiding the dipstick from the cylinder head into the crankcase in the form of deep hole bores in the cylinder head and the cylinder block. Deep hole bores of this type result in a corresponding machining expenditure due to the bore length that frequently exceeds 400 mm. One also needs to take into account the constructive complexity of arranging corresponding bores that need to extend straight due to the manufacturing technology at a suitable location in the cylinder head and in the cylinder block. Consequently, the expenditures for this technical solution prove unjustifiably high.

The present invention therefore is based on the objective of developing means for guiding a dipstick that serves for determining the filling level of the lubricating oil in an internal combustion engine. It should be possible to realize the guiding means with a simple manufacturing technology and with a minimal number of individual components. Furthermore, other objectives, desirable features, and characteristics will become apparent from the subsequent summary and detailed description and the appended claims, taken in conjunction with the accompanying drawings and this background.

SUMMARY

In view of the foregoing, an internal combustion engine for a motor vehicle with a crankcase is provided that contains lubricating oil and on which a cylinder block with several cylinder bores is arranged. The cylinder bores are closed with a cylinder head that is arranged on the cylinder block and features cylinder head covers for covering a valve mechanism mounted on the cylinder head. Means are provided for guiding a dipstick that serves for determining the filling level of the lubricating oil.

An embodiment proposes that means for guiding a dipstick are realized in the form of cast channels that extend through at least the cylinder head and the cylinder block, wherein the upper outlet of said channels is provided for inserting and for removing the dipstick in the region of one cylinder head cover.

At least one advantage of the embodiment can be seen, in particular, in that the means for guiding the dipstick can already be realized during the casting of the cylinder block, the cylinder head and the cylinder head cover without any machining expenditure. After the assembly of the aforementioned components, the individual channels form the complete guide channel for the dipstick. No additional installation steps are required. The external sealing surfaces are completely eliminated. The expenditures are also lowered due to the fact that additional components are eliminated. The guidance of the dipstick within the internal combustion engine also reduces the multitude of variations because it is now possible to utilize a single guiding solution for all conceivable installation situations of the internal combustion engine in a motor vehicle.

According to an additional embodiment of the invention, it is proposed that a separate guide tube of plastic or another suitable material is arranged in the cast channel of the cylinder block. The separate guide tube improves the sliding properties in the channel of the cylinder block that has a quite significant length. The upper end of the guide tube may be provided with an outer radial collar section that cooperates with a corresponding depression in the channel in order to position the guide tube relative to the channel. Due to this measure, the guide tube is easily and reliably held relative to the cylinder block; the guide tube may be fixed within the corresponding depression in the cylinder block, for example, by providing the collar section with an outer radial knurling or the like. It would also be possible to realize the collar section in the shape of a star or the like.

It is advantageous that the cast channels for guiding the dipstick can be simultaneously utilized as a so-called blow-by channel for compensating the pressure in the interior of the cylinder housing or as an oil return channel from the cylinder head to the crankcase. This measure eliminates the need for additional channels for the aforementioned functions such that the manufacturing expenditures are correspondingly reduced.

The channels, particularly the channel of the cylinder block, preferably feature sections with a larger diameter that are caused by the casting technology and lead into sections with a smaller diameter via funnel-shaped transition sections in order to guide the dipstick. The funnel-shaped transition sections ensure that the dipstick can be displaced along the cast channels in an unobstructed fashion. Sections with a larger diameter may be required for reasons of casting technology in order to realize the channel, in particular, in the cylinder block over its entire length without creating problems due to the relatively small diameter and the required material wall thicknesses. In many instances, only the measure of providing funnel-shaped transition sections makes it possible to realize a cast channel for guiding the dipstick with the corresponding manufacturing technology.

Such funnel-shaped transition sections of a channel can also be used for producing a transition into the preferably provided separate guide tube described above without creating any undesirable sharp edges at this location.

In the context of the embodiments of the present invention, the crankcase is formed by a generally known, intermediate plate for enclosing the crankshaft bearing arrangement, and a lower oil pan for accommodating the lubricating oil, with oil sump, is fixed on the intermediate plate. The lower end of the dipstick protrudes into the lubricating oil situated in the oil pan in order to measure the oil level. In addition, the channel for guiding the dipstick that extends through the intermediate plate may be provided with a tube that protrudes in the direction of the oil pan in order to guide the dipstick into the oil pan in the region of its distant end. The tube can be easily pressed into the channel of the intermediate plate.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following

DETAILED DESCRIPTION

Figure 1:
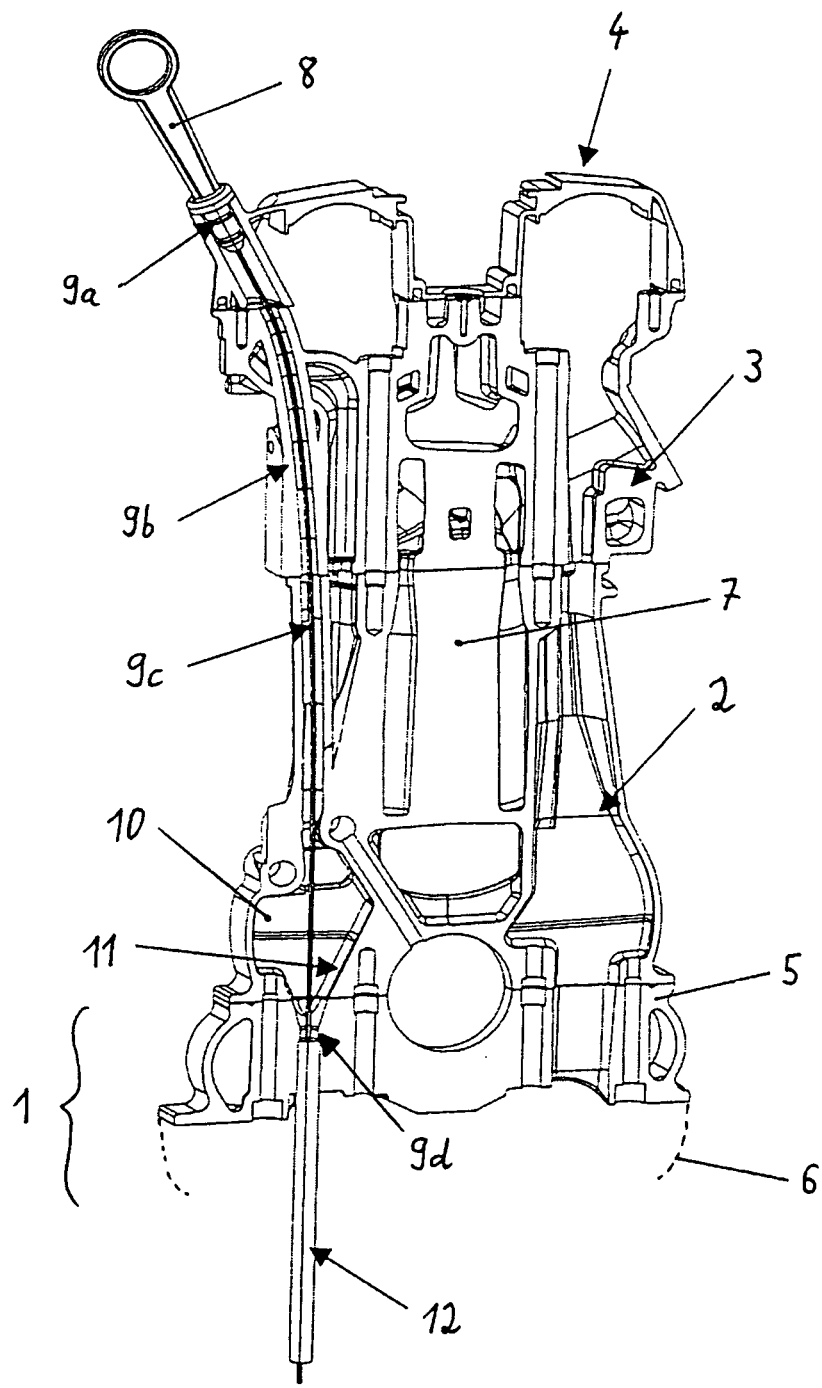
FIG. 1 is a longitudinal section through an internal combustion engine with a first embodiment of means for guiding a dipstick.

According to FIG. 1, an internal combustion engine for a motor vehicle essentially comprises a lower crankcase 1, on which a cylinder block 2 is mounted that is provided with a cylinder head 3 with cylinder head covers 4. The crankcase 1 is essentially formed by an intermediate plate 5 with an oil pan 6. The intermediate plate 5 serves for enclosing the not-shown crankshaft bearing arrangement fixed between the cylinder block 2 and the intermediate plate 5. The oil pan 6 arranged underneath the intermediate plate 5 serves as a collection container for the lubricating oil of the internal combustion engine that lubricates the moving parts of the internal combustion engine during its operation. The cylinder block 2 contains several cylinder bores 7 for accommodating (not-shown) pistons. The cylinder bores 7 are closed with the cylinder head 3, in which the valve mechanism (intake and exhaust valves) is accommodated.

The internal combustion engine furthermore features a dipstick 8 that extends through one of the cylinder head covers 4, the cylinder head 3, the cylinder block 2 and the intermediate plate 5. To this end, the aforementioned components are respectively provided with a cast channel $9a$ to $9d$. The dipstick 8 is inserted and removed in the region of the upper outlet of the channel $9a$ arranged in the cylinder head cover 4.

The channel $9c$ arranged in the cylinder block 2 features a section 10 that has a larger diameter due to the casting technology, wherein this section leads into a section with a smaller diameter via a funnel-shaped transition section 11 in order to guide the dipstick 8.

The channel $9d$ extending through the intermediate plate 5 features a tube 12 that extends in the direction of the oil pan 6 and is pressed into the channel $9d$ in order to realize the lower guidance of the dipstick 8.

Figure 2:
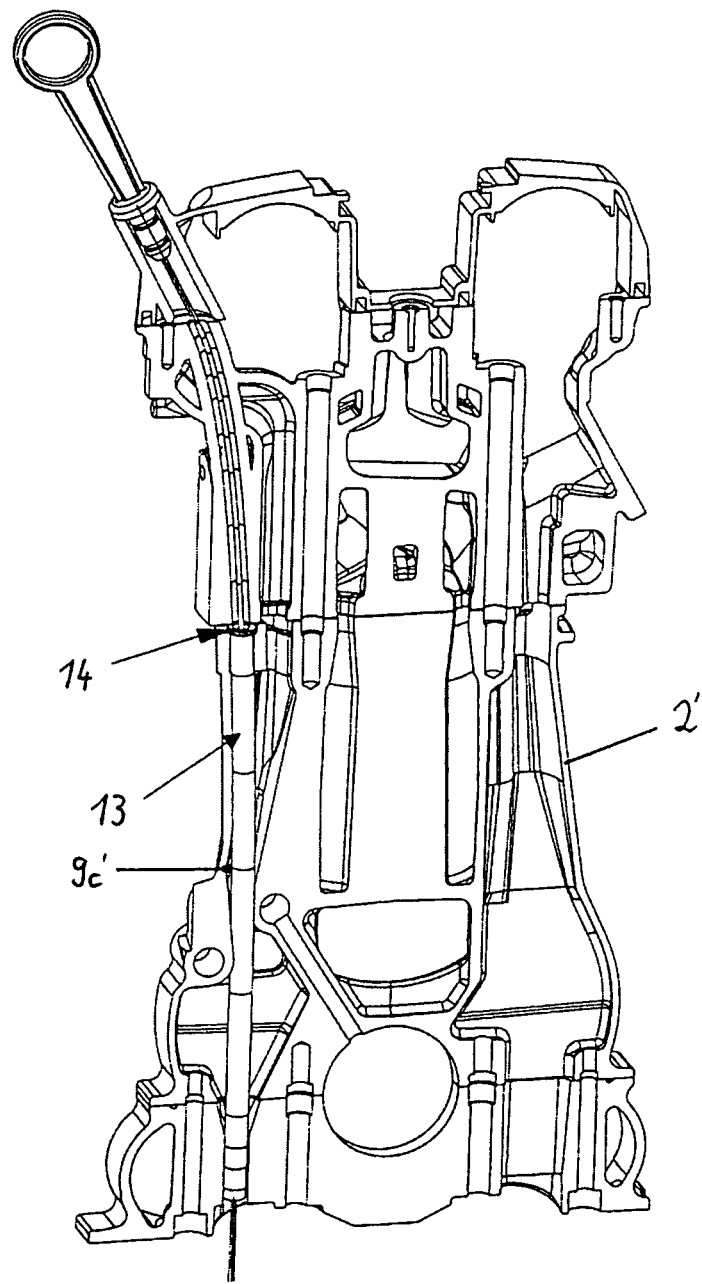
FIG. 2 is a longitudinal section through an internal combustion engine with a second embodiment of means for guiding a dipstick.

In contrast to the above-described embodiment, the channel $9c'$ in the cylinder block $2'$ of the embodiment of an internal combustion engine illustrated in FIG. 2 is provided with a separate guide tube 13. The guide tube 13 serves for improving the sliding properties of the cast channel $9c'$ that is particularly long at this location. On its upper end, the guide tube 13 features an outer radial collar section 14. The collar section 14 serves for positioning and holding the guide tube 13 in a corresponding depression in the channel $9c'$. Otherwise, the internal combustion engine of the second embodiment corresponds to the internal combustion engine of the first embodiment that was described in detail above.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents. Moreover, the embodiments are not limited to the two above-described preferred embodiments. On the contrary, it would be conceivable to realize modified embodiments that utilize the scope of protection of the following claims. For example, it would also be possible that the internal combustion engine features a two-part crankcase, in which no intermediate plate is provided. In addition, the inventive cast channel for guiding the dipstick within the internal combustion engine may also extend through other generally known case components of an internal combustion engine that are arranged between the cylinder head and the oil pan.

The invention claimed is:

1. An internal combustion engine for a motor vehicle with a crankcase that is configured to contain lubricating oil, comprising:
   a cylinder block arranged on the crankcase;
   a plurality of cylinder bores within the cylinder block;
   a cylinder head closing the plurality of cylinder bores;
   cylinder head covers configured to cover a valve mechanism mounted on the cylinder head;

cast channels that extend through the cylinder head cover, cylinder head, and the cylinder block, wherein an upper outlet of said cast channel is provided in one of the cylinder head covers for inserting and removing a dipstick.

2. The internal combustion engine according to claim 1, wherein a separate guide tube of plastic is arranged at least in at least one of the cast channels of the cylinder block.

3. The internal combustion engine according to claim 1, wherein the cast channels can be used as at least one of a blow-by channel for compensating pressure in the interior of the crankcase and an oil return channel from the cylinder head to the crankcase.

4. An internal combustion engine for a motor vehicle with a crankcase that is configured to contain lubricating oil, comprising:
- a cylinder block arranged on the crankcase;
- a plurality of cylinder bores within the cylinder block;
- a cylinder head closing the plurality of cylinder bores;
- a cylinder head cover configured to cover a valve mechanism mounted on the cylinder head;
- a cast channel that extends through the cylinder head cover, the cylinder head, and the cylinder block, wherein an upper outlet of said cast channels is provided for inserting and removing a dipstick in a region of one of the cylinder head covers; and
- wherein at least one of the cast channels comprises sections with a larger diameter that are formed by casting and lead into sections with a smaller diameter via funnel-shaped transition sections in order to guide the dipstick.

5. An internal combustion engine for a motor vehicle with a crankcase that is configured to contain lubricating oil, comprising:
- a cylinder block arranged on the crankcase;
- a plurality of cylinder bores within the cylinder block;
- a cylinder head closing the plurality of cylinder bores;
- cylinder head covers configured to cover a valve mechanism mounted on the cylinder head;
- cast channels that extend through at least the cylinder head and the cylinder block, wherein an upper outlet of said cast channels is provided for inserting and removing a dipstick in a region of one of the cylinder head covers; and
- wherein at least one of the cast channels comprises sections with a larger diameter that are formed by casting and lead into sections with a smaller diameter via funnel-shaped transition sections in order to guide the dipstick.

6. The internal combustion engine according to claim 5, wherein the crankcase comprises an intermediate plate for enclosing a crankshaft bearing arrangement and a lower oil pan.

7. The internal combustion engine according to claim 6, wherein at least one of the channels extends through the intermediate plate and comprises a tube that protrudes in a direction of an oil pan.

* * * * *